United States Patent
Jaasma et al.

(10) Patent No.: US 6,192,918 B1
(45) Date of Patent: Feb. 27, 2001

(54) PRESSURE VESSEL ASSEMBLY

(75) Inventors: Servatius Alfons Maria Jaasma; Marcus Johannes Petrus Gerardus Den Hartog, both of Eindhoven (NL)

(73) Assignee: Vialle Beheer B.V., Eindhoven (NL)

( * ) Notice: Subject to any disclaimer, the term of this patent is extended or adjusted under 35 U.S.C. 154(b) by 0 days.

(21) Appl. No.: 09/297,764

(22) PCT Filed: Nov. 7, 1997

(86) PCT No.: PCT/NL97/00610

§ 371 Date: Jun. 7, 1999

§ 102(e) Date: Jun. 7, 1999

(87) PCT Pub. No.: WO98/20247

PCT Pub. Date: May 14, 1998

(30) Foreign Application Priority Data

Nov. 7, 1996 (NL) .................................................. 1004471

(51) Int. Cl.$^7$ ............................. F02M 37/04; F16K 27/08
(52) U.S. Cl. ............. 137/382; 137/565.34; 137/565.24; 123/509
(58) Field of Search ............................. 137/382, 565.17, 137/565.24, 565.34, 588; 123/509; 62/50.6

(56) References Cited

U.S. PATENT DOCUMENTS

| | | | |
|---|---|---|---|
| 2,673,010 | * 3/1954 | Barrow | 137/382 X |
| 2,932,310 | * 4/1960 | Koblish | 62/50.6 |
| 3,014,623 | 12/1961 | Horn et al. . | |
| 4,593,835 | * 6/1986 | Kikkawa et al. | 62/50.6 X |
| 4,798,522 | * 1/1989 | Kaga et al. | 137/565.24 X |
| 4,860,545 | * 8/1989 | Zwick et al. | 62/50.6 |
| 4,869,225 | * 9/1989 | Nagata et al. | 123/509 |
| 4,989,572 | * 2/1991 | Giacomazzi et al. | 123/509 X |
| 5,038,741 | 8/1991 | Tuckey . | |
| 5,070,849 | * 12/1991 | Rich et al. | 123/509 |
| 5,141,013 | * 8/1992 | Zink et al. | 137/382 X |
| 5,613,476 | * 3/1997 | Oi et al. | 123/509 |
| 5,887,617 | * 3/1999 | Frank | 123/509 X |
| 5,931,335 | * 8/1999 | Cippitani | 137/382 X |

FOREIGN PATENT DOCUMENTS

| | | |
|---|---|---|
| 783 739 | 9/1972 | (BE) . |
| 94 11 124 | 12/1995 | (DE) . |
| 0 042 887 | 1/1982 | (EP) . |
| 0 120 343 | 10/1984 | (EP) . |
| 2 462 295 | 2/1981 | (FR) . |

* cited by examiner

Primary Examiner—John Rivell
(74) Attorney, Agent, or Firm—Young & Thompson

(57) ABSTRACT

The pressure vessel (1) forming the fuel tank has an opening (22) with a flange (3) to accept a flanged accessories plate (4) as a lid. A plate has a fuel outlet (12), a fuel return (13), a blow-off safety valve (15) and a filling line. A fuel pump (11) is suspended off the plate with electrical connections (16) to drive the pump. The pump is suspended from the plate by exchangeable spacer device (10). It ensures that the bottom of the pump is near the base of the fuel tank.

8 Claims, 2 Drawing Sheets

PRESSURE VESSEL ASSEMBLY

Figure 1:
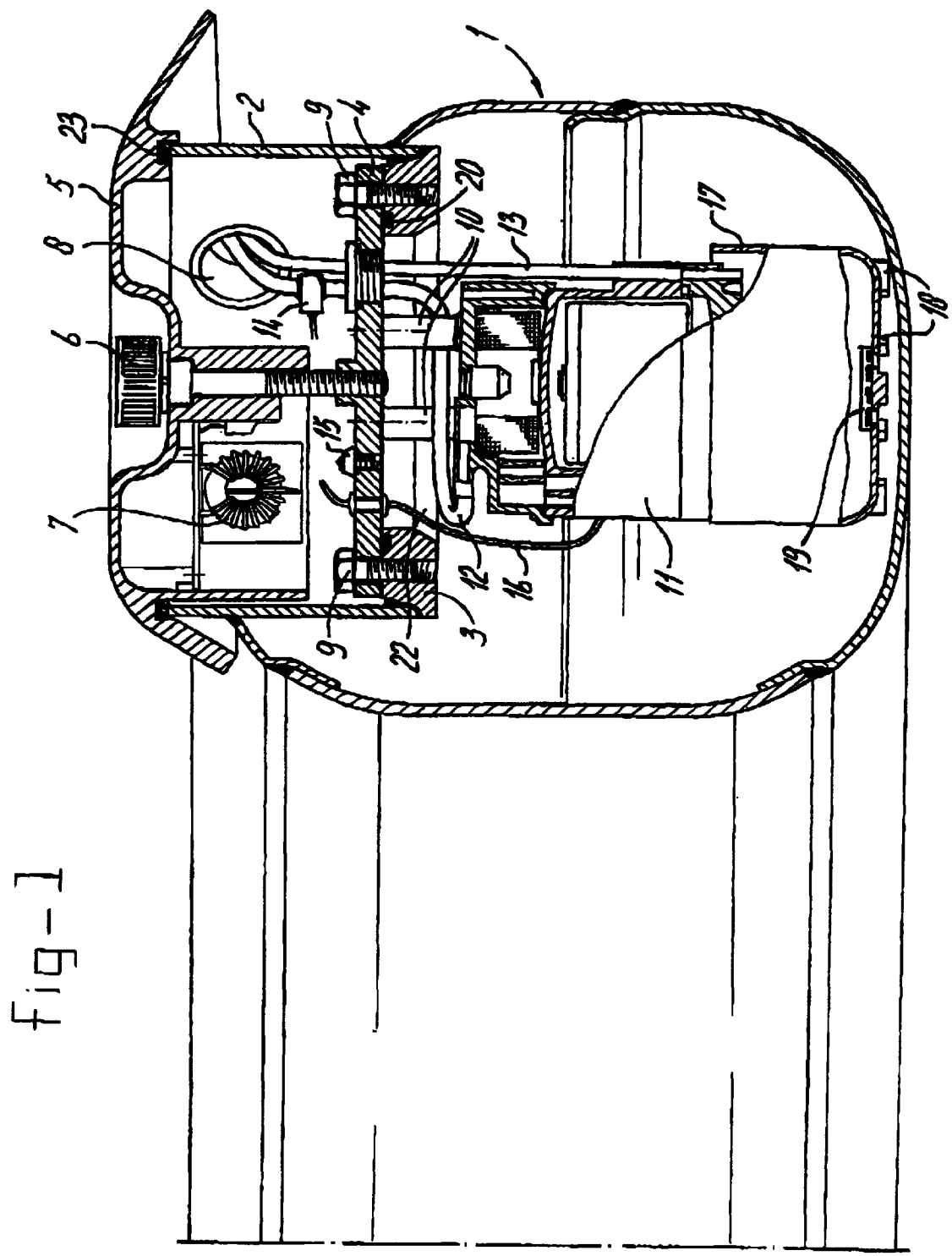

The present invention relates to a pressure vessel assembly according to the preamble of claim 1.

Such a pressure vessel assembly is known from DE- 94 11 124 U 1. In the case of conventional pressure vessels such as those for holding LPG a plate is welded onto a part of the wall thereof, in order to achieve a greater wall thickness in this way. Holes are tapped in said wall, and the various inlets, outlets and the like are fitted thereon. Since this is a relatively complex method, it is proposed in the above prior art to provide such a so-called accessories plate as a separate part and attach it to the tank by means of a seal. In this way the accessories plate with parts mounted thereon can be fitted in the tank in a single operation. This is important particularly if a complex float device for the filling level is fitted.

Such an accessories plate is preferably designed for a system with single line, in the case of which liquefied gas under pressure is supplied to an internal combustion engine and combusted there. However, a recent development makes use of an injection system for LPG in which a fuel pump is used and a return line is present, inter alia, in order to ensure that liquefied gas is constantly present in the injection lines concerned. In this case it is essential for such a pump to operate as far as possible in excess pressure, because when negative pressure is created during the suction of the liquefied gas there is a danger of this gas passing into vapour form. For that reason, every effort is made to fit such a pump at the bottom of a pressure vessel if possible. However, this entails drawbacks as regards design, because a top opening of considerable size must be present. Another problem is that tanks with different dimensions are used, depending on the type of vehicle.

DE-94 11 124 describes a fuel tank for motor vehicles in which the fuel pump is mounted inside the tank through a spring loaded structure supporting on the other hand on a vertical mounting rod suspended from the top wall of the tank.

The object of the present invention is to provide a pressure vessel assembly in the case of which the fuel pump is easy to fit, and in the case of which it is always ensured that such a fuel pump is situated near the bottom of the vessel.

This object is achieved in the case of a pressure vessel assembly of the type described above by the fact that a fuel pump is present in the vessel, which fuel pump is suspended from the flanged plate solely by way of exchangeable spacer means of a length to be selected, said length being selected in such a way that the underside of the fuel pump is situated near the bottom, while the accessories plate is provided with a fuel return line element.

The invention is based on the idea of using the removable accessories plate known in the prior art. This produces a relatively large opening which can be used in a particularly effective way for allowing through the fuel pump. Contrasting with earlier proposals, the fuel pump is not fixed to the bottom of the vessel, but to the accessories plate, so that it is possible to mount everything in advance. This is important in particular for the coupling of pipes, but spacers are used between the accessories plate and the fuel pump, in order to provide.an adaptation to different (height) dimensions of the tanks. If these spacers are in the form of vibration-damping elements such as silent blocks, the advantage obtained here is that the noise of the pump is insulated as much as possible relative to the environment.

The accessories plate can be combined in any way known in the prior art with the box which has to be fitted thereon as a compulsory measure in many countries. Such a box is an additional safety measure which prevents gas from escaping to, for example, the boot of the car if there is leakage between the accessories plate and the various accessories fitted thereon. For this purpose, a gastight box which is in communication by way of an outlet with the outside of the vehicle, preferably the underside, is stipulated. In the event of any leakage, the gas in question will escape to the outside of the vehicle, so that the risk of explosion during starting and the like is largely removed. Such an accessories box in the prior art is a separate expensive casting which has to be fitted by complicated steps.

According to one-object of the invention, use of such a complex accessories box is avoided by the fact that the pressure vessel comprises a circular opening which is made in the pressure vessel and in which a pipe section is welded, the end of which pipe section facing the inside of the vessel being provided with the flanged edge, and in which the end facing away from the inside of the vessel can be provided with a cover, i.e. the construction for the accessories plate is effectively combined with the box described above.

The now very simply designed cover can be used in particular for the accommodation of electronic components. This cover is a relatively cool part and provides such components with sufficient protection. Such electronic components comprise in particular circuits relating to the control of the pump, Although the pump can comprise any construction known in the prior art, it is preferably provided with a buffer element fitted in its vicinity. LPG can be stored in said buffer element, and in particular if the tank is almost empty, the presence of the buffer element ensures that the pump does not suck up vapour instead of liquefied gas. A non-return valve is preferably fitted in the buffer element, so that material din only enter the buffer element. The buffer element can be made of a relatively flexible material which can adapt to the local conditions.

According to a further advantageous embodiment, the fuel return line opens put into the buffer element, so that when the pressure vessel is just about empty it is ensured that liquid is sucked up as long as possible. The good heat conduction will mean that the slightly warmer liquid from the return line is cooled immediately, before being pumped back by the fuel pump described above.

Figure 2:
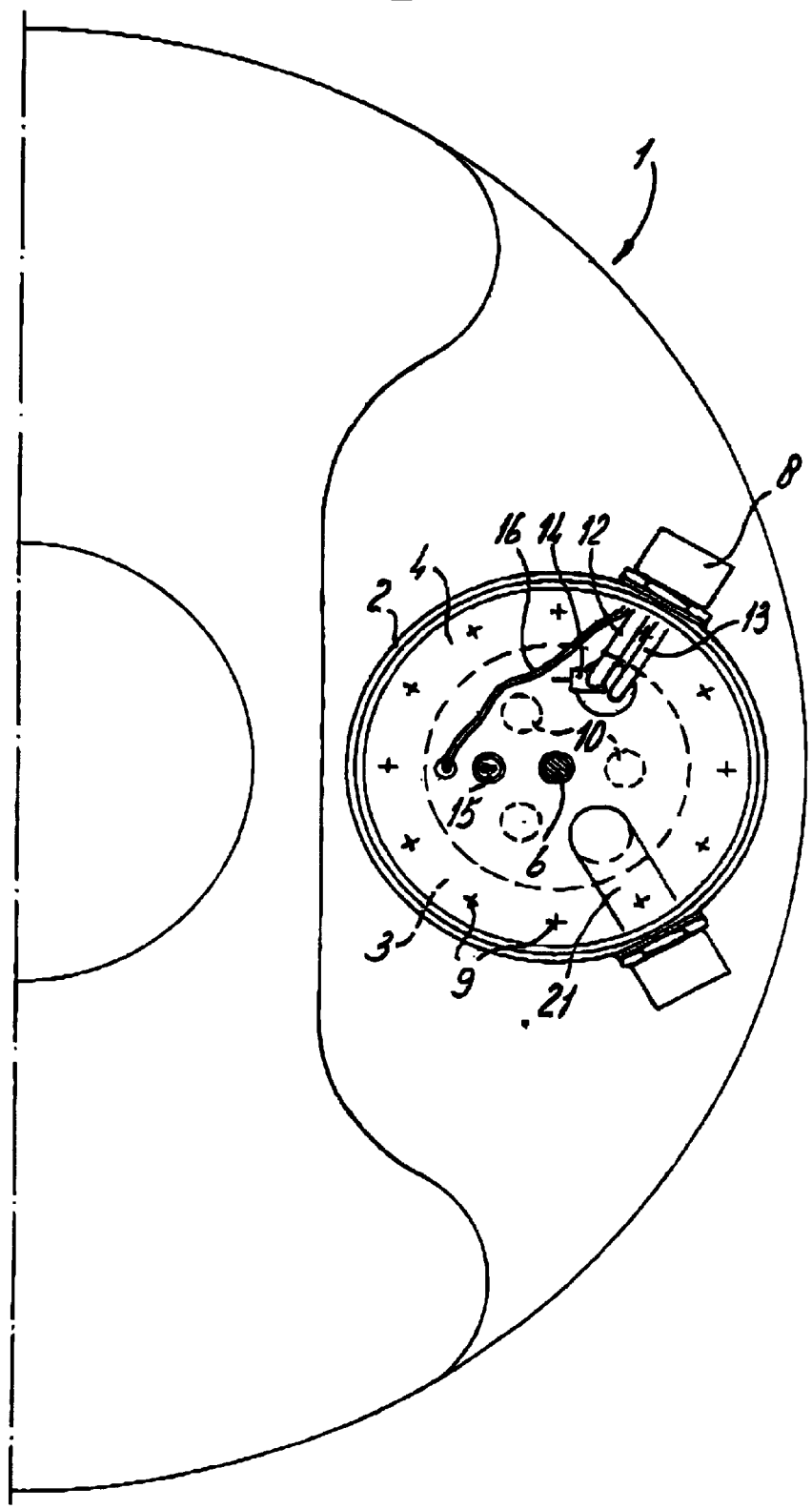

The invention will be explained in grater detail below with reference to an exemplary embodiment shown in the drawing, in which:

FIG. 1 shown a side view in cross-section of an embodiment of the pressure vessel assembly according to the in invention; and FIG. 2 shows a top view of the part near the pipe 2 according to FIG. 1 with the various accessories.

A pressure vessel is indicated by 1 in the figures. Said pressure vessel is provided with an opening (not shown in any further detail) in which a pipe 2 is fitted in a gastight manner by welding. Said pipe 2 is provided with a flanged edge 3 on the side facing the inside of the tack. On the other side, said pipe is dimensioned in such a way that a cover 5 can be placed over it and can be tightened by means of a bolt 6. An O-ring 23 is present between cover 5 and pipe 2. Flanged edge 3 is designed for receiving a flanged plate 4 thereon. An O-ring 20 provides for the seal, while fixing is achieved by means of bolts 9. Flanged plate 4 is in the form of an accessories plate, on which the usual accessories of an LPG tank for a motor vehicle are situated. These are an inlet 12 provided with a shut-off valve 14, a return line 13, a release valve 15 and wiring 16 and filling line 21. Wiring 16 is used for the control of the fuel pump indicated by 11. Fuel pump 11 is fixed on accessories plate 4 by means of vibration-damping elements such as silent blocks 10. Three of such silent blocks are present in the case of the embodiment shown here. The height of the silent blocks, i.e. the distance from the fuel pump 11 to the accessories plate 4, is selected in such a way that the underside of the fuel pump is situated close to the bottom of the pressure vessel 1. This is important because negative pressure, which could lead to vaporization of the LPG present in the fuel pump, has to be prevented from occurring therein. Provision can be made for adaptations for tanks with different heights by using silent blocks of greater or smaller height. In this way it is always guaranteed that the underside of the pump is situated as close as possible to the bottom of the pressure vessel. Of course, a construction can be fitted in the pressure vessel to prevent the pressure vessel from being filled to more than the legal percentage. Fuel pump 11 is not shown in any further detail, but contains filters and the like in the usual way. On the underside the fuel pump 11 is provided with bellows 17 which surround it and act as a buffer. Said bellows are made of a slightly flexible material, of which a number of "feet" 18 rest on the bottom of the tank. Slight tolerances can be accommodated because of the flexible nature of the material. This means that the buffer will always touch the bottom with the flexible sound-damping material, while the pump is always suspended from the accessories plate by way of the silent blocks described above. Maximum sound insulation is consequently obtained and, on the other hand, optimum emptying of the vessel is ensured. Buffer 17 is provided on the underside with an inlet valve 19 which functions as a one-way valve. This ensures that when the tank is almost empty and bends are being negotiated, LPG situated in the buffer can flow back into an empty part of the pressure vessel.

The construction shown here makes it possible in a simple manner to fix together the assembly consisting of accessories plate and pump and fit the tank in one operation. This contrasts with the prior art, in which it was necessary to fix the pump on the bottom of the pressure vessel by an extremely complicated operation.

Although the invention is described with reference to a preferred embodiment, it must be understood that numerous modifications can be made to it without going beyond the scope of the appended claims.

What is claimed is:

1. Pressure vessel assembly for fuel, comprising a pressure vessel with an opening and a flanged plate to be fitted thereon, which flanged plate is provided with a number of connections, comprising the fuel outlet from the vessel, a fuel pump being present in the vessel, characterized in that in the opening a pipe section is welded, the end of which pipe section facing the inside of the vessel being provided with a flanged edge, said flanged plate comprising filling line and blow-off safety valve, and a fuel return line element.

2. Pressure vessel assembly according to claim 1, wherein said fuel pump is suspended from the flanged plate solely by way of spacer means of a length to be selected, said length being selected in such a way that the underside of the fuel pump is situated near the bottom.

3. Pressure vessel assembly according to claim 2, wherein said spacer means comprise vibration-damping means.

4. Pressure vessel assembly according to claim 1, provided with a cover, wherein electronic components are accommodated in said cover.

5. Pressure vessel assembly according to claim 1, in which the pump comprises a buffer container fitted near the bottom end thereof.

6. Pressure vessel assembly according to claim 5, in which said buffer container is made of a flexible material and is of such a length when not deformed that in the fitted position the free end thereof rests against the bottom of the vessel.

7. Pressure vessel assembly according to claim 5, in which said buffer container is provided with an inlet valve.

8. Pressure vessel assembly according to claim 5, in which the fuel return line opens out into said buffer container.

* * * * *